United States Patent
Rajagopalan et al.

(10) Patent No.: US 12,236,224 B2
(45) Date of Patent: Feb. 25, 2025

(54) SYSTEMS AND METHODS FOR MANAGING WORKSPACES IN A HETEROGENEOUS WORKSPACE ENVIRONMENT

(71) Applicant: Dell Products, L.P., Round Rock, TX (US)

(72) Inventors: Vivekanandh Narayanasamy Rajagopalan, Bangalore (IN); Gokul Thiruchengode Vajravel, Bangalore (IN); Vivek Viswanathan Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 217 days.

(21) Appl. No.: 17/524,949

(22) Filed: Nov. 12, 2021

(65) Prior Publication Data

US 2023/0153093 A1 May 18, 2023

(51) Int. Cl.
*G06F 9/445* (2018.01)
*G06F 8/65* (2018.01)
*G06F 8/71* (2018.01)
*G06F 11/07* (2006.01)
*H04L 67/00* (2022.01)

(52) U.S. Cl.
CPC ............... *G06F 8/65* (2013.01); *G06F 8/71* (2013.01); *G06F 11/0769* (2013.01); *H04L 67/34* (2013.01)

(58) Field of Classification Search
CPC ..... H04L 67/306; H04L 67/303; H04L 67/55; H04L 41/12; H04L 41/5054; H04L 43/0817; H04L 67/30; H04L 41/20; H04L 67/34; G06F 8/65; G06F 8/71; G06F 8/61; G06F 8/60; G06F 9/44505; G06F 9/4451; G06F 16/23; G06F 16/1873; G06F 40/186; G06F 12/0806; G06F 40/197; G06F 11/0769
USPC .................................. 717/168–178
See application file for complete search history.

(56) References Cited

U.S. PATENT DOCUMENTS

| | | | | |
|---|---|---|---|---|
| 2011/0113094 A1* | 5/2011 | Chunilal | ............ | G06Q 20/1235 709/204 |
| 2011/0225575 A1* | 9/2011 | Ningombam | ....... | G06F 11/3051 717/170 |
| 2016/0142482 A1* | 5/2016 | Mehta | ....................... | G06F 8/61 709/203 |
| 2023/0086234 A1* | 3/2023 | Rajagopalan | ............. | G06F 8/65 717/168 |

\* cited by examiner

*Primary Examiner* — Chuck O Kendall
(74) *Attorney, Agent, or Firm* — Fogarty LLP (57) ABSTRACT

Systems and methods for deploying software updates in heterogeneous workspace environments are described. The system for managing workspaces includes computer-executable instructions for obtaining multiple inventories corresponding to multiple workspaces of an IHS, wherein the inventories each include information associated with the applications deployed in its respective workspace. The instructions are further executed to, for each inventory, identify the workspace associated with the inventory, determine which of the applications are to be updated with new software, and deploy the determined new software to the identified workspace.

18 Claims, 7 Drawing Sheets

SYSTEMS AND METHODS FOR MANAGING WORKSPACES IN A HETEROGENEOUS WORKSPACE ENVIRONMENT

FIELD

This disclosure relates generally to Information Handling Systems (IHSs), and, more specifically, to systems and methods for managing workspaces in a heterogeneous workspace environment.

BACKGROUND

As the value and use of information continues to increase, individuals and businesses seek additional ways to process and store it. One option available to users is an Information Handling System (IHS). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated.

Variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Communication networks, and in particular the Internet, has revolutionized the manner in which software is updated on a computer system. Prior to the advent of the Internet, a software provider would package the update on computer readable media, and the computer owner had to obtain a copy of the media to complete the update in order to make the software update accessible to the user of the computer system. However, distributing software updates on computer readable media was often expensive for software providers, which tended to restrict the number of software updates that a software provider would issue. As a consequence, substantial time would pass between updates, and consumers had to manage certain known issues for these time periods, at least until an update became available. Another aspect of this older method was that many modifications were packaged into a single update to reduce the costs associated with distributing the update.

Nowadays, software updates are typically made available on one or more download sites as soon as the software provider can produce them. In this manner, software providers can be more responsive to critical flaws, security concerns, and general customer needs. As a result, to update software, a customer would query an update site for software updates, and download and install the software update if available. For example, a typical network-based software update procedure may include the steps of issuing a request over a network to a software provider's download site (e.g., update source) for a software update applicable to the client computer. The update source responds to the client computer with the software update requested by the client computer in the update request. After the client computer has received the software update, the client computer installs the received software update.

One benefit of updating software in such a manner is the reduced cost associated with producing and distributing software updates. Additionally, software updates can now be performed more frequently, especially those that address critical issues and security. Still further, a computer user has greater control as to when and which software updates should be installed on the client computer. The inventors of the present case, nevertheless, have discovered that computing systems employing multiple heterogeneous workspaces may present certain challenges to the otherwise efficient mode of performing software updates from online sources. It is with these concerns in mind, among others, that embodiments of the present disclosure have been developed.

SUMMARY

Systems and methods for deploying software updates in heterogeneous workspace environments are described. The system for managing workspaces includes computer-executable instructions for obtaining multiple inventories corresponding to multiple workspaces of an IHS, wherein the inventories each include information associated with the applications deployed in its respective workspace. The instructions are further executed to, for each inventory, identify the workspace associated with the inventory, determine which of the applications are to be updated with new software, and deploy the determined new software to the identified workspace.

According to another embodiment, a method includes the steps of obtaining multiple inventories corresponding to multiple workspaces that are each deployed with one or more application, and for each inventory, identifying the workspace associated with the inventory, determining which of the applications are to be updated with new software, and deploying the determined new software to the identified workspace. Each of the inventories include information associated with the applications deployed in its respective workspace.

According to yet another embodiment, a workspace orchestrator includes computer-executable instructions to obtain a plurality of inventories corresponding to a plurality of workspaces that are each deployed with one or more apps, wherein the inventories each include information associated with the applications deployed in its respective workspace. The instructions also, for each inventory, identifies the workspace associated with the inventory, determines which of the applications are to be updated with new software, and deploys the determined new software to the identified workspace.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

DETAILED DESCRIPTION

Embodiments of the present disclosure provide a system and method for managing workspaces in heterogeneous workspace environments. Whereas currently implemented IHSs used by consumers are configured with workspaces, such as software-based workspaces (e.g., docker), hardware-based workspaces (e.g., virtualBox, VMWare, etc.), and cloud-based workspaces, management of the applications (apps) deployed in those workspaces has heretofore remained a challenging endeavor. Embodiments of the present disclosure provide a solution to this problem, among others, by implementing executable code that generates inventories for each workspace in the IHS so that the management of those workspaces and any applications deployed inside may be coordinated with one another in an efficient and cost effective manner.

Many currently available IHSs also referred to as computing devices are configured with heterogeneous workspaces for various reasons including enhanced isolation of apps, security improvements, and the like. Example workspaces may include software-based workspaces (e.g., docker, snap, Progressive Web App (PWA), Virtual Desktop Integration (VDI), etc.), hardware-based workspaces (e.g., Virtual Machines (VMs)), or cloud-based workspaces that are accessed from a publicly available communication network, such as the Internet. These workspaces are typically managed using orchestrators that can manage software-based workspaces, hardware-based workspaces, as well as cloud-based workspaces. Workspaces may have varying levels of performance and security KPIs running in the IHS as well as in the cloud.

It would often be useful to, with the exception of certain Operating System and vendor service apps, encapsulate most applications in a workspace for enhanced security and scalability purposes. The workspaces can be implemented using software or hardware isolation methods. With hardware isolation methods, a guest OS can be different from the host OS, thus creating a heterogeneous computing environment. For example, a Windows10 host OS may use a lightweight Ubuntu guest OS to run Linux-native applications and/or certain web-apps.

With the widespread introduction of orchestrators, the Information Technology Decision Maker (ITDM) may need to adopt management of heterogeneous workspaces (e.g., clients) involving a mix of cloud native apps, containerized native "workspace" apps, and local (e.g., endpoint) native services (e.g., apps, drivers, etc.) that are executed directly by the host OS. For example, an IHS deployed with a Windows10 host OS can have an Electron based App and a Windows 32-bit native application running locally, a Web-application or UWP application running inside a software-based workspace (e.g., Sandboxie), and Ubuntu applications running inside a hardware-based workspace. The problem is that conventional management tools (e.g., orchestrators) do not typically support such a heterogeneous computing environment and/or the various use cases (Intra/Inter-IHS orchestration) that it may encounter.

To provide a particular use-case example, the ITDM often encounters challenges with updating software on workspaces, particularly when certain applications executed on different workspaces may possess dependencies to one another. Similar to application and OS servicing in host computing devices (e.g., bare-metal machines), the workspaces and their deployed applications should be managed using well-known update models (e.g., inventory-collection, install, update, rollback, etc.). While the current update infrastructure (e.g., Agile, Catalog Generation Service, Catalogs, DCRM, etc.) targets the drivers, software apps, BIOS, firmware, and the like for the host OS through update catalogs, it typically does not cater to workspace management, such as managing updates on an Ubuntu workspace from a host Windows10 running directly on the IHS. The workspace Image and related driver metadata for updating the workspace and its deployed applications are typically not handled by such current update infrastructure. Also, the current update infrastructure caters only to Windows-based OSs. Whereas in the heterogeneous environment, the existing catalog structure and the service agents will not work. Given an example of an Ubuntu host OS using a KVM workspace and a windows-based workspace to host Win32 apps, the applications running inside the Windows-based workspace should be handled differently. In this particular case, it should use a MSI package rather than a *.DEB package that is used by Linux-based OSs.

To provide yet another user-case example, the ITDM deploying a latest supported app-version based on a workspace may encounter certain migration scenarios when a first application is migrated to another workspace. In a heterogeneous computing environment, the application may be migrated from one workspace type to another. For example, a Zoom video meeting application may, for various reasons, be migrated from a software-based workspace (e.g., Docker) to a hardware-based workspace (e.g., Windows10-based workspace). In this scenario, a particular version of an application may need to be installed on the Windows10-based workspace. Whenever an application is migrated across workspaces with different types, the latest IT-supported version of the application may need to be installed as per the workspace's type. The IT-supported version may not need to be the latest available version, due largely to the fact that up to 25 percent of older software versions are deployed. It would, however, be beneficial to manage how different versions of a particular application are deployed in the heterogeneous computing environment. Moreover, this factor essentially creates a need for having an updated infrastructure to inventory and service the host OS, and the workspaces along with its hosted-applications (i.e., containerized-apps) in a heterogeneous computing environment, while handling the app's workspace changes (as part of intra/inter IHS orchestration).

In summary, the above example scenarios show that the existing workspace management solutions fail to keep track of the application changes and workspace environment changes. Without solving the above-mentioned problem(s), the management solutions cannot effectively manage the heterogeneous computing environment. As will be described in detail herein below, embodiments of the present disclosure provide a system and method for managing workspaces in a heterogeneous workspace in which workspaces and their deployed applications may deployed and managed in a structured manner that cures the aforecited problems with conventional orchestrators.

Figure 1:
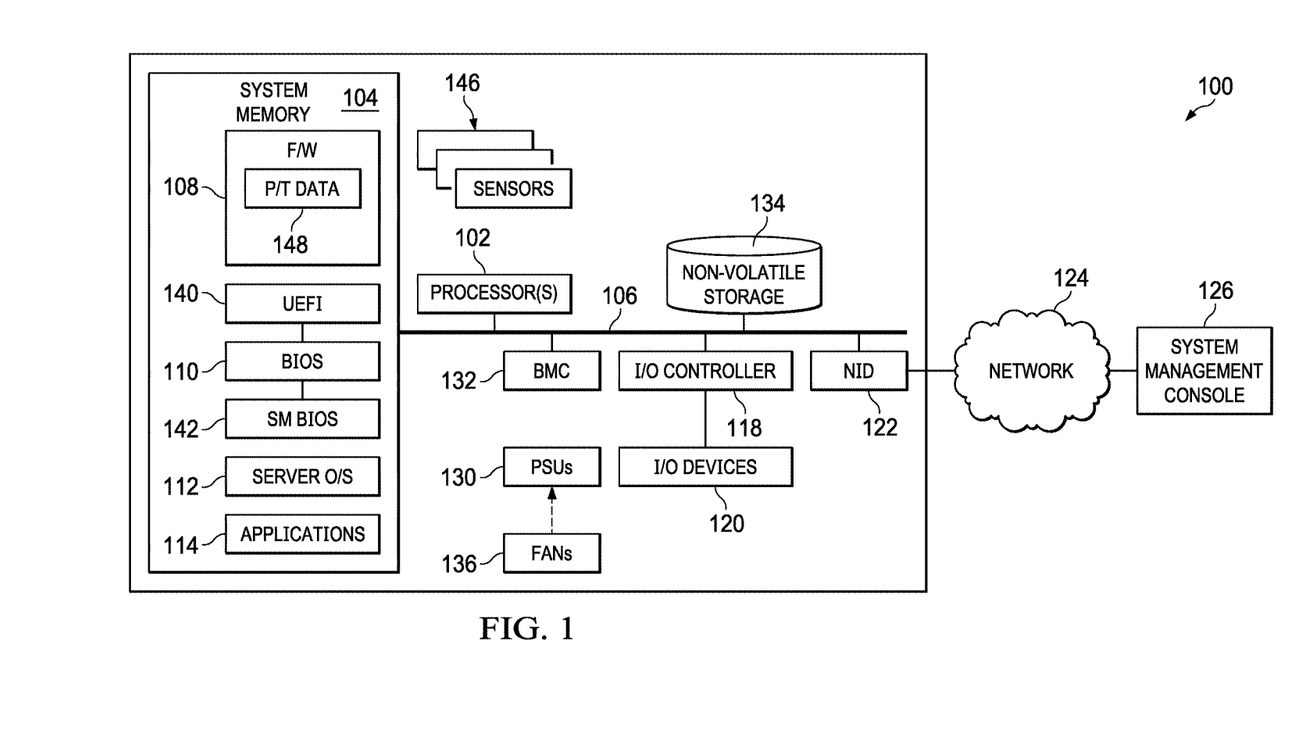
FIG. 1 is a diagram depicting components of an example IHS configured to implement systems and methods for managing workspaces in a heterogeneous workspace environment.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An example of an IHS is described in more detail below. FIG. 1 shows various internal components of an IHS configured to implement certain of the described embodiments. It should be appreciated that although certain embodiments described herein may be discussed in the context of a personal computing device, other embodiments may utilize various other types of IHSs.

FIG. 1 is a block diagram of examples of components of an Information Handling System (IHS), according to some embodiments. Particularly, IHS 100 includes one or more processor(s) 102 coupled to system memory 104 via system interconnect 106. System interconnect 106 may include any suitable system bus. System memory 104 may include a plurality of software and/or firmware modules including firmware (F/W) 108, basic input/output system (BIOS) 110, operating system (O/S) 112, and/or application(s) 114. Software and/or firmware module(s) stored within system memory 104 may be loaded into processor(s) 102 and executed during operation of IHS 100.

F/W 108 may include a power/thermal profile data table 148 that is used to store power profile data and thermal profile data for certain hardware devices (e.g., processor(s) 102, system memory 104, non-volatile storage 134, NID 122, I/O controllers 118, etc.). System memory 104 may include a UEFI interface 140 and/or a SMBIOS interface 142 for accessing the BIOS as well as updating BIOS 110. In general, UEFI interface 140 provides a software interface between an operating system and BIOS 110. In many cases, UEFI interface 140 can support remote diagnostics and repair of computers, even with no operating system installed. SMBIOS interface 142 can be used to read management information produced by BIOS 110 of IHS 100. This feature can eliminate the need for the operating system to probe hardware directly to discover what devices are present in the computer.

IHS 100 includes one or more input/output (I/O) controllers 118 which manage the operation of one or more connected input/output (I/O) device(s) 120, such as a keyboard, mouse, touch screen, microphone, a monitor or display device, a camera, a microphone, audio speaker(s) (not shown), an optical reader, a universal serial bus (USB), a card reader, Personal Computer Memory Card International Association (PCMCIA) slot, and/or a high-definition multimedia interface (HDMI) coupled to IHS 100.

IHS 100 includes Network Interface Device (NID) 122. NID 122 enables IHS 100 to communicate and/or interface with other devices, services, and components that are located externally to IHS 100. These devices, services, and components, such as a system management console 126, can interface with IHS 100 via an external network, such as network 124, which may include a local area network, wide area network, personal area network, the Internet, etc.

IHS 100 further includes one or more power supply units (PSUs) 130. PSUs 130 are coupled to a BMC 132 via an $I^2C$ bus. BMC 132 enables remote operation control of PSUs 130 and other components within IHS 100. PSUs 130 power the hardware devices of IHS 100 (e.g., processor(s) 102, system memory 104, non-volatile storage 134, NID 122, I/O controllers 118, PSUs 130, etc.). To assist with maintaining temperatures within specifications, an active cooling system, such as one or more fans 136 may be utilized.

IHS 100 further includes one or more sensors 146. Sensors 146 may, for instance, include a thermal sensor that is in thermal communication with certain hardware devices that generate relatively large amounts of heat, such as processors 102 or PSUs 130. Sensors 146 may also include voltage sensors that communicate signals to BMC 132 associated with, for example, an electrical voltage or current at an input line of PSU 130, and/or an electrical voltage or current at an output line of PSU 130.

BMC 132 may be configured to provide out-of-band management facilities for IHS 100. Management operations may be performed by BMC 132 even if IHS 100 is powered off, or powered down to a standby state. BMC 132 may include a processor, memory, and an out-of-band network interface separate from and physically isolated from an in-band network interface of IHS 100, and/or other embedded resources.

In certain embodiments, BMC 132 may include or may be part of a Remote Access Controller (e.g., a DELL Remote Access Controller (DRAC) or an Integrated DRAC (iDRAC)). In other embodiments, BMC 132 may include or may be an integral part of a Chassis Management Controller (CMC).

In many cases, the hardware devices configured on a typical IHS 100 are registered in its system BIOS. In such cases, BIOS 110 may be accessed to obtain the power/thermal profile data table 148 for those hardware devices registered in BIOS 110. For any non-registered (unsupported/unqualified) hardware device, however, its power profile and/or thermal profile may be unknown. In such situations, the server thermal control is often required to run in an open loop. That is, the thermal profile for the IHS 100 may be difficult, if not impossible, to optimize.

Power related issues also exist. For example, if a non-registered hardware device draws power beyond a maximum capacity of PSU(s) 130 is reached or exceeded, hardware protection may prevent the IHS from even booting. Additionally, if the incoming non-registered hardware device's power budget is higher than the existing power capacity of the system, it can, and often will, halt the IHS during BIOS Power On Self Test (POST), such as with an F1 and/or F2 error.

Figure 2:
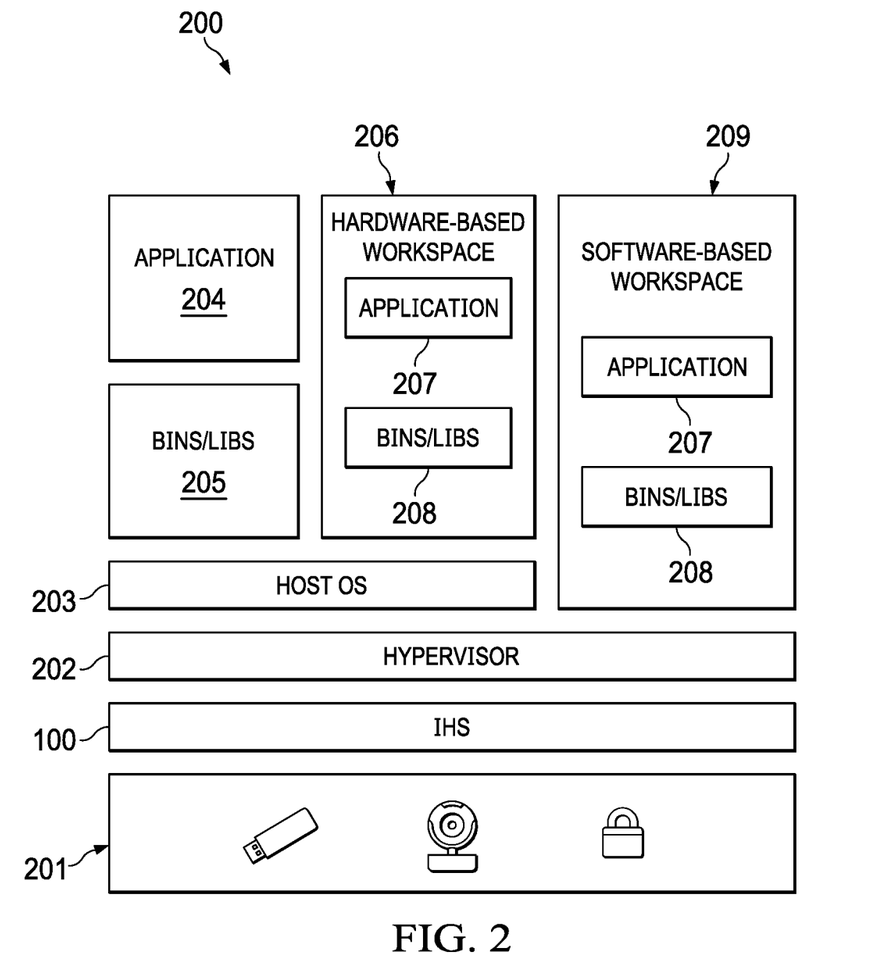
FIG. 2 is a diagram of an example heterogeneous workspace environment according to one embodiment of the present disclosure.

FIG. 2 is a diagram of an example heterogeneous workspace environment 200 according to one embodiment of the present disclosure. In environment 200, peripheral devices 201 may include, for example, input devices (e.g., mice, keyboard, etc.), sensors (e.g., cameras, microphones, etc.), optical drives, I/O ports, and the like. In this implementation, hypervisor 202 is shown as a type-1, native, or bare-metal hypervisor running directly on IHS 100 to manage host OS 203. In other implementations, however, hypervisor 202 may be a type-2 or hosted hypervisor running on top of host OS 203.

To produce and/or manage a first type of workspace, hypervisor 202 may support host OS 203, which in turn enables native application 204 to execute using binary files and/or library files (bins/libs) 205. Additionally, or alternatively, to produce and/or manage a second type of workspace, hypervisor 202 may instantiate hardware-based workspace 206 (e.g., a Virtual Machine (VM)). Additionally, or alternatively, to produce and/or manage a third type of workspace, hypervisor 202 further may instantiate software-based workspace 209 (e.g., docker, snap, Progressive Web App (PWA), INTEL Clear Container, etc.). Each of software-based workspace 209 and hardware-based workspace 206 may be configured with a containerized application 207 that is executed using one or more container bin/libs 208.

In some implementations, software-based workspace 209 may be configured to execute applications or workloads that do not require a high level of security because they are trusted. Conversely, hardware-based workspaces 206 may be configured to execute applications or workloads that do require a high level of security, for example, because they are untrusted. Additionally, or alternatively, hardware-based workspace 206 may be configured to execute applications that require an OS different than host OS 203.

In some embodiments, when applications are distributed and/or deployed from a trusted source, software-based workspace 209 may be used as it generally has less overhead and provides higher containerized application density. Conversely, when applications are distributed and/or deployed from an untrusted source, hardware-based and/or hypervisor-isolated hardware-based workspace 206 may be used, despite presenting a higher overhead, to the extent it provides better isolation or security.

Software-based workspace 209 shares the kernel of host OS 203 and UEFI services, but access is restricted based upon the user's privileges. Hardware-based workspace 206 has a separate instance of OS and UEFI services. In both cases, workspaces 206 and 209 serve to isolate applications from host OS 203 and other applications.

Systems and methods described herein may be used to manage (e.g., migrate, add/remove applications to/from a workspace, add/remove workspaces to/from the IHS, and/or install software updates) heterogeneous workspace environments. As used herein, the term "update" generally refers to a set of changes to a computer program, software, or application, including device drivers and firmware, that is designed to update, fix, and/or improve it (e.g., by fixing security vulnerabilities and other bugs, and/or by increasing the functionality, usability, or performance of a program, etc.). For example, an update may include an executable file that, upon execution, loads a program into memory that manages the installation of the update into the target program(s) on disk. In some cases, a service pack or an update package may include a collection of updates delivered in the form of a single installable file.

In various embodiments, systems and methods described herein may obtain multiple inventories corresponding to the workspaces configured in the heterogeneous workspace environment 200. The inventories each include information associated with one or more apps, drivers, and/or firmware which may be deployed in its respective workspace, and for each inventory. The system and method may also identify the workspace associated with the inventory, determine which of the applications are to be updated with new software, and deploy the determined new software to the identified workspace. In one embodiment, systems and methods may uniquely identify each workspace in the heterogeneous workspace environment 200 by extracting at least a portion of the Global Universal Identifier (GUID) from the workspace identifier. Thus, inventories for each of the workspaces 206, 209 may be stored in a common location, while providing for unique identification of which workspace is to receive certain management functions.

In some cases, heterogeneous orchestrators may migrate the workloads of a first workspace to a second workspace for various reasons. In such cases, the system and method may determine which of the applications are to be updated with new software by identifying a first workspace that has been migrated to a second workspace. If the workspace is inter migrated, such as being migrated from a software-based workspace to a cloud-based workspace, the system and method may move the applications from the first workspace to the second workspace, and purge the inventory associated with the first workspace. However, if the target workspace is a different type from the source workspace, the system and method may delete the application information from the inventory associated with the first workspace, and add the application information to the inventory associated with the second workspace. Additionally, if the workspace is added (e.g., instantiated) on the IHS, the system and method may generate a new inventory for the added workspace. Alternatively, if the workspace is deleted, the system and method may delete the inventory associated with the deleted workspace.

Figure 3A:
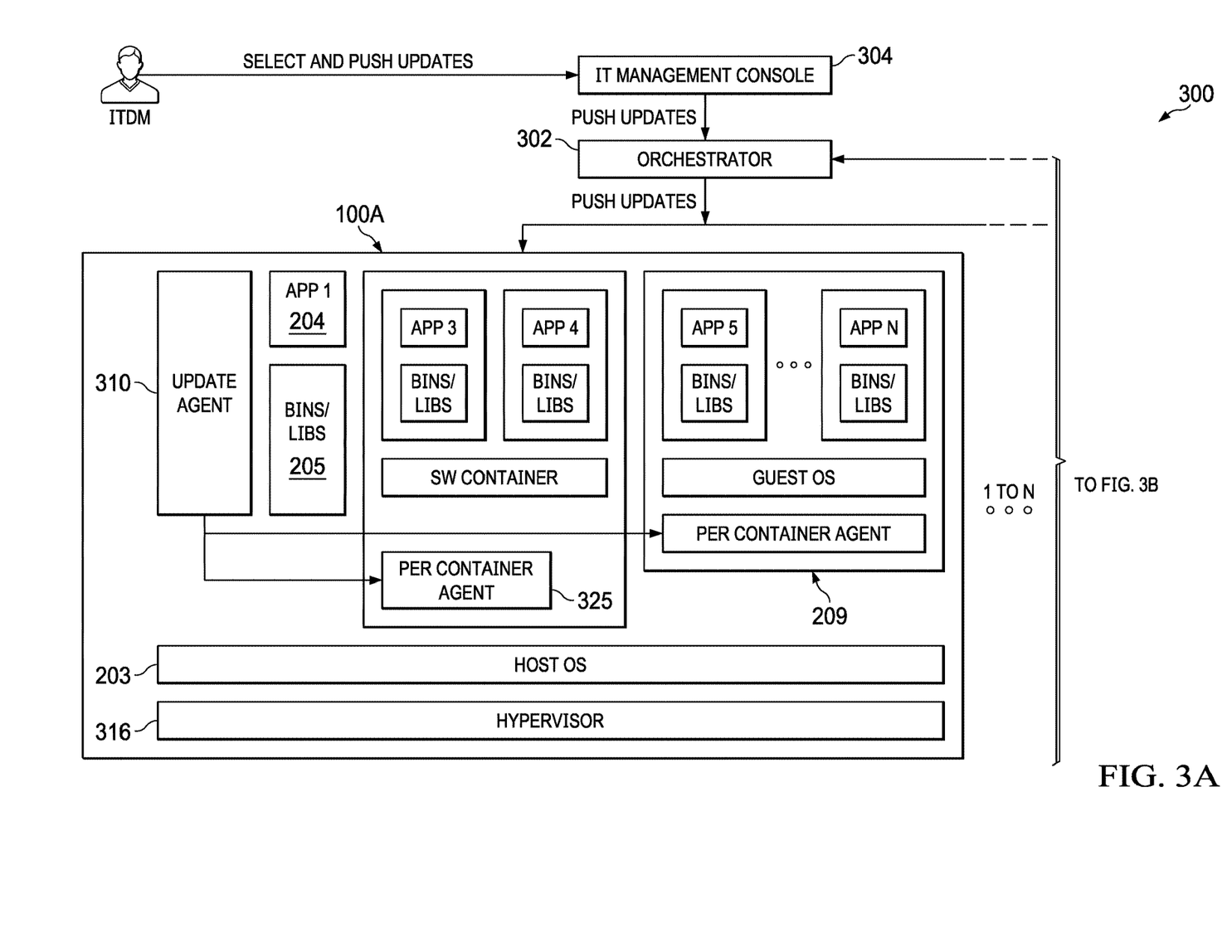
FIGS. 3A and 3B illustrate an example system for managing workspaces in a heterogeneous workspace environment according to one embodiment of the present disclosure.
Figure 3B:
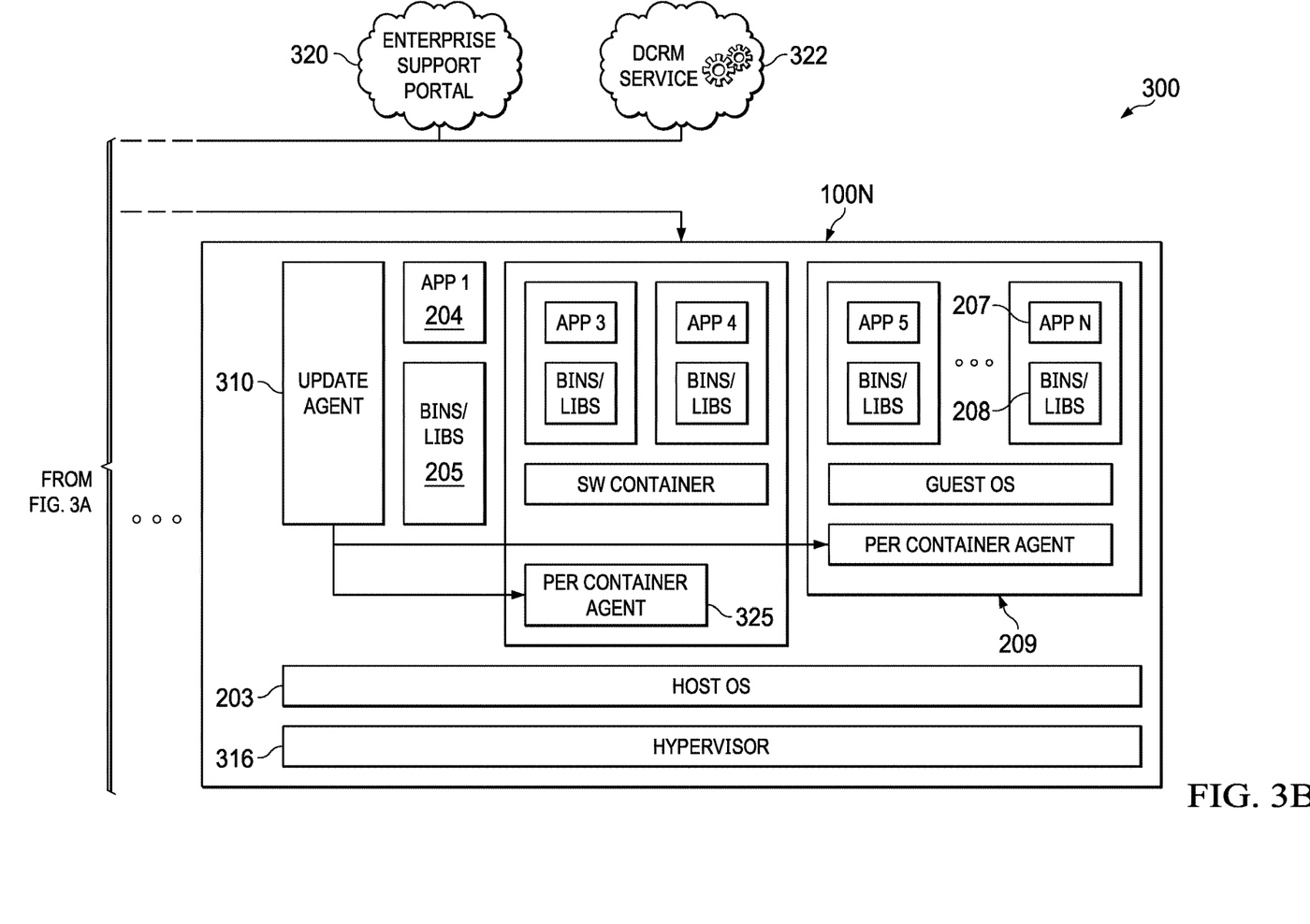

FIGS. 3A and 3B illustrates an example of system 300 for managing workspaces in a heterogeneous workspace environment according to one embodiment of the present disclosure. In some embodiments, system 300 includes an orchestrator 302 in communication with multiple IHSs 100A-N, an IT management console 304, an enterprise support portal 306, and a Document Control and Records Management (DCRM) service 322. While the present example embodiment is being described in terms of multiple IHSs 100A-N, it is contemplated that in other embodiments, the system and method may be implemented with a single IHS 100 without departing from the spirit and scope of the present disclosure.

Each IHS 100A-N is configured to execute an update agent 310, one or more applications 204 and certain bins/libs 205 directly from a host OS 203. Each IHS 100A-N may also execute a software-based workspace, and/or a hardware-based workspace using a hypervisor 316. For example, IHS 100A is shown configured with a software-based workspace 206 and a hardware-based workspace 206, while the other IHS is shown configured with two software-based workspaces. Nevertheless, it should be understood that each IHS may be configured with any quantity of software-based workspaces and/or hardware-based workspaces. Each of the software-based workspaces and hardware-based workspaces may have one or more containerized applications 207 and associated container bin/libs 208.

In general, the hardware-based workspaces 206 and software-based workspaces 209 provide an isolated environment for executing their respective containerized applications 207. The selection of either a hardware-based workspace 206 or a software-based workspace 209 for deploying applications 207 may be based on a trade-off of performance, amount of memory required, level and type of isolation, and the like. For example, a hardware-based workspace 206 may, in many cases, provide superior performance over a software-based workspace 209, but require relatively more memory space for its operation. Additionally, a host-based application 204 executed directly on the host OS 203 of the IHS 100 may provide superior performance to hardware-based workspaces 206, but provide relatively little isolation from other processes running on the IHS 100. In one embodiment, the orchestrator 302 may be configured to obtain information (e.g., performance, memory usage, security requirements, etc.) about certain containerized applications 207, and determine whether that containerized application 207 would be more suited for deployment in a different workspace. For example, if the orchestrator 302 determines that current loading of one of the IHSs 100A-N becomes excessive, it may automatically migrate a containerized application 207 to another workspace 206, 209, or a cloud-based workspace. In some cases, the orchestrator 302 may migrate the containerized application 207 to another existing workspace, or it may instantiate a new workspace 206, 209 and deploy the containerized application 207 on the newly instantiated workspace 206, 209.

The orchestrator 302 is configured to receive instructions (e.g., workspace management instructions) from the ITDM's management console 304. In some cases, the management console 304 may operate under control of the orchestrator 302. The orchestrator 302 may also have access to an enterprise support portal 320 and/or a DCRM service 322. The enterprise support portal 320 may be one that is administered by an organization, such as a corporation, school, or other enterprise that may supply client IHSs 100 to some, most, or all of its members or customers. In one embodiment, the enterprise support portal 320 may be, for example, an online support portal managed by a vendor of the IHSs 100A-N in which update packages may be downloaded and installed on the IHS 100A-N as appropriate. Embodiments of the present disclosure implemented for use with such organizations may be particularly beneficial in that the IHSs 100A-N provided to its members are typically configured with known sets of resources (e.g., hardware components, software packages, peripheral components, etc.) over which the administrators may have direct or at least indirect control such that dependencies between those resources may be readily assessed and remedied as they occur. For example, the DELL CORPORATION provides certain classes of premier, high quality client IHSs 100 to users, such as via their LATITUDE and PRECISION product lines that are often included with certain established well-known resources. As such, software package upgrades to these resources can be managed at a level where dependencies between those software packages can be resolved to a relatively good degree.

The DCRM service 322 generates catalogs identifying certain apps, drivers, firmware, and the like that are to be downloaded and installed on the target IHS 100A-N based on certain factors, such as whether a new version is available, compatibility with other apps, drivers, and/or firmware currently deployed, licensing agreements to download and install such apps, and the like. For example, the DELL CORPORATION, which is headquartered in Round Rock, Texas, has an online support portal for distributing software packages that are packaged as Dell Update Packages (DUPs), which is a particular type of Management Update package (MUP). These MUPs encapsulate software package updates along with certain support data and scripts, such as software package metadata, applicability checking features, dependency checking features, and the like.

The update agent 310 communicates with the per workspace agent 325 deployed in each workspace 206, 209 to manage their operation via the orchestrator 302. Particularly, the update agent 310 may run on the host OS. The per workspace agent 325 may perform various services in connection with the operation of its respective workspace 206, 209, such as collecting an inventory of the workspace 206, 209. An inventory generally refers to an itemized list of currently deployed applications 207 and/or container bin/libs 208 deployed as well as their version. The update agent 310 may orchestrate the collection of inventories on the host OS and on all workspaces 206, 209 to be used by the orchestrator 302 for, among other things, updating each IHS 100A-N. For example, the update agent 310 may collect host OS and BIOS inventory (e.g., OS Version, BIOS System ID, BIOS Version, etc.). The update agent 310 may also scan IHS 100 for PCI devices or drivers, PnP devices or drivers, and/or other software applications, and it may collect the currently installed applications details. The update agent 310 may also identify the workspaces (e.g., software and/or hardware workspaces) running in the host OS and their IP addresses. The update agent 310 may also invoke an inventory collection process inside of each workspace 206, 209 running on the host OS. For example, the inventory may identify containerized applications 207 including its application name or identifier, version, plugins, and the like.

Figure 4A:
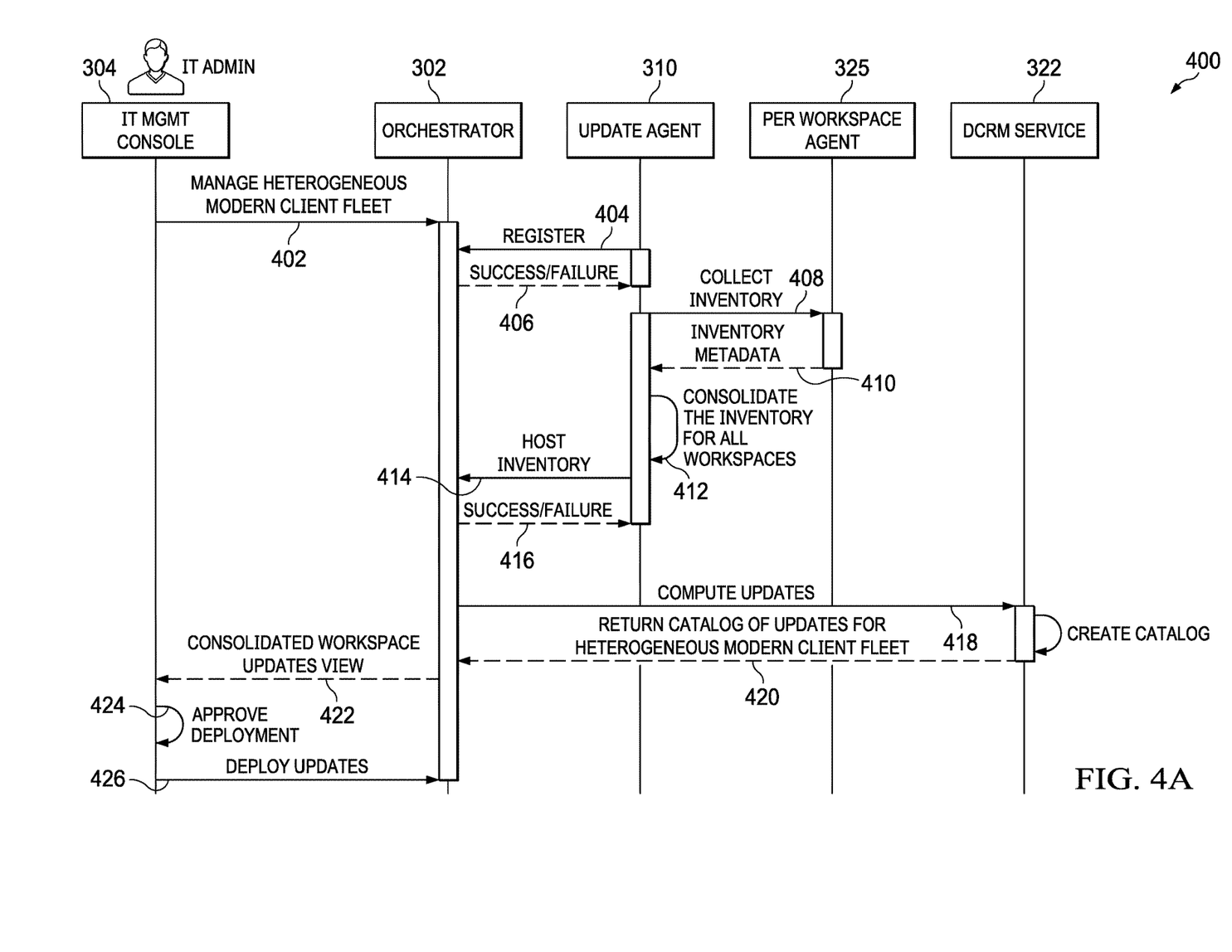
FIGS. 4A and 4B illustrate a workflow diagram describing certain steps of an embodiment of a workspace management method that may be used to update multiple workspaces configured in one or more IHSs according to one embodiment of the present disclosure.
Figure 4B:
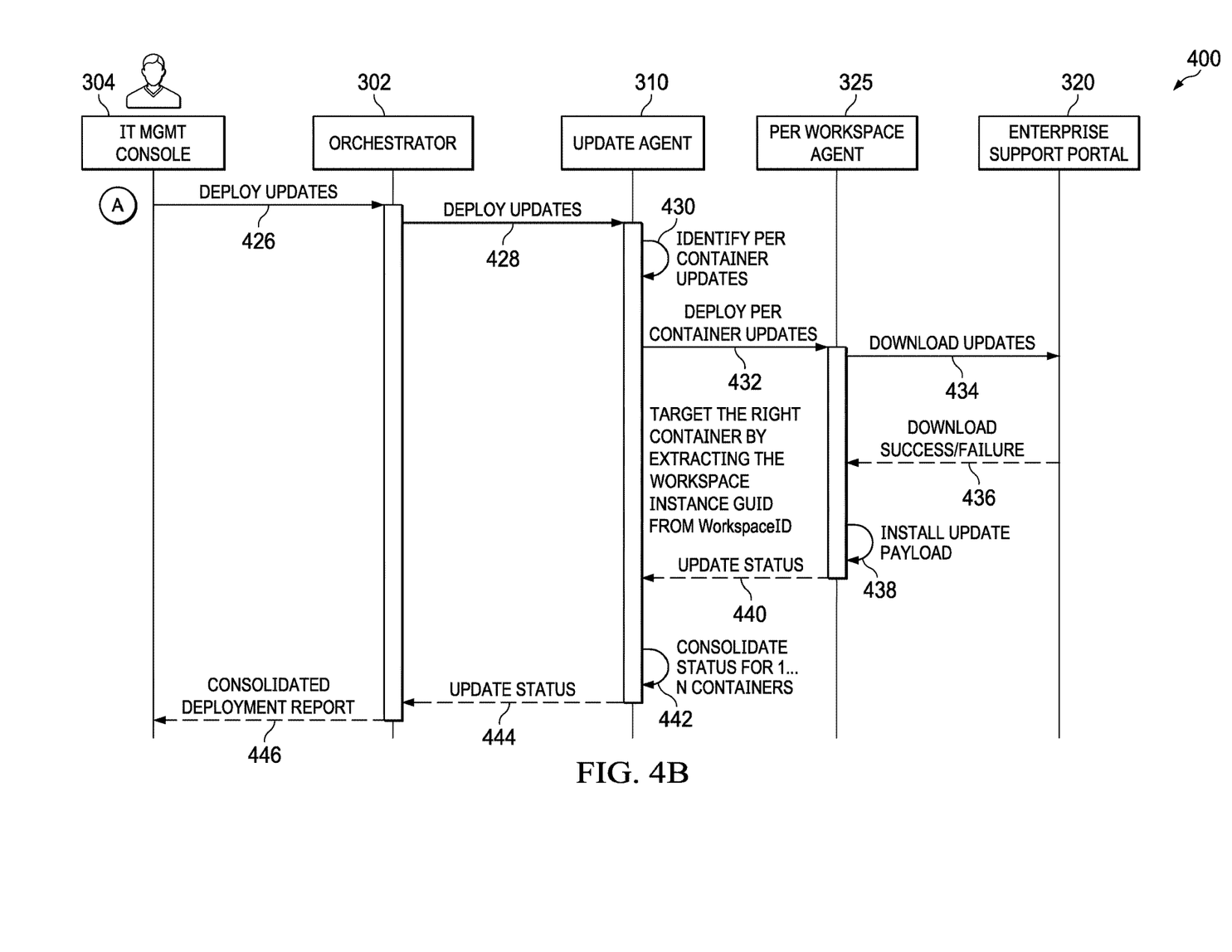

FIGS. 4A and 4B illustrate a workflow diagram describing certain steps of an embodiment of a workspace management method 400 that may be used to update multiple workspaces 206, 209 configured in one or more IHSs 100A-N according to one embodiment of the present disclosure. As will be described in detail herein below, the method 400 may be provided for updating software across multiple heterogeneous workspaces deployed in one or more IHSs 100. Although only one per workspace agent 325 associated workspace 206, 209 is shown in the method 400, it should be understood that the method 400 can be practiced with any quantity of per workspace agents 325, such as two or more per workspace agents 325 for updating the containerized applications 207 of their associated workspaces.

At step 402, the ITDM management console 304 issues a request to the orchestrator 302 to manage heterogeneous workspaces 206, 209 in one or more IHSs 100. Thereafter at step 404, the orchestrator 302 receives registration information from the update agent 310 associated with each IHS 100. For example, the orchestrator 302 upon receiving the request from the ITDM management console 304, may scan the system for all IHSs 100 in communication with the orchestrator 302, and in response, each update agent 310 may respond with the registration message. The orchestrator 302 then acknowledges with either a success or failure message at step 406.

At step 408, the update agent 310 collects inventory information from each per workspace agent 325. In one embodiment, the update agent 310 may generate issue a request to the per workspace agent 325 to scan its respective workspace 206, 209 for any deployed application 207, along with any associated container bin/libs 208, and send the gathered inventory information to the update agent 310. The per workspace agent 325 then responds either with a success or failure message to the inventory request message at step 410. In one embodiment, the update agent 310 may also scan the host OS 203 for any host-based applications 204, drivers (e.g., PCI device drivers, PnP device drivers, firmware, etc.), and firmware configured in its respective IHS 100.

At step 412, the update agent 310 consolidates the inventory for all workspaces 206, 209 in each IHS 100. Consolidating the inventories generally refers to the act of resolving dependencies for some, most, or all updatable components in the IHS 100 and its workspaces 206, 209. The dependencies may include one or more of: intra-workspace dependencies, container-host software dependencies, inter-workspace dependencies, and/or Progressive Web App (PWA) dependencies.

Intra-workspace dependencies occur when an application (e.g., including one or more libraries, runtime files, etc.) depends upon another in the same workspace. For instance, consider a scenario where Ubuntu is hosting a Docker image having a Zoom application and its dependencies (e.g., decoders). In some implementations, if a decoder has the latest update, systems and methods described herein may update the decoder inside the container with a package compatible with the Docker image.

Container-host software dependencies occur when there is a sharing of resources between the host OS and a workspace. Particularly, a software-based container may allow an application instantiated therein to share the host-OS kernel libraries, for instance, such that a Docker container hosting a Zoom application may share a webcam and GPU driver installed in the host OS. In some implementations, if there is an update available for the webcam driver, systems and methods described herein may identify the compatible webcam driver (for both host OS & container image) and install along with its dependencies before updating the Zoom application inside the container.

Inter-workspace dependencies refer to dependencies between resources deployed across distinct workspaces. Particularly, an application and its dependent libraries may be deployed in different workspaces (e.g., to share the same libraries across different workspaces), for instance, such that an OpenCL library hosted in a first workspace may be used by a Natural Language Processing (NLP) engine in a second workspace and an AutoCAD in a third workspace. In some implementations, systems and methods described herein may identify dependency chains across the workspaces and may service the workspaces accordingly for minimal downtime.

PWA dependencies occur when a PWA has dependent services running on the host, another PWA, and/or in a workspace. For example, an AutoCAD PWA running in Chrome may use an OpenCL lib running in a given workspace. In some implementations, systems and methods described herein may identify such dependency chains across PWAs and workspaces.

In one embodiment, the update agent 310 may associate each workspace 206, 209 with its Global Universal Identifier (GUID) so that the workspace 206, 209 can be readily matched with its IHS 100. Such a feature may be useful when multiple IHSs 100 are managed simultaneously so that each workspace entry in the catalog may be readily matched to the IHS 100 on which it is deployed.

Table 1 shows an example of how the GUID of the workspace 206, 209 may be concatenated to form a workspace ID:

TABLE 1

| IHS Service Tag | Workspace Type ID | Workspace Unique Instance ID | Workspace ID |
|---|---|---|---|
| W10HN5Q8I2 | Docker => 0xA000 | {Guid_1} | W10HN5Q8I2_A000_{Guid_1} |
|  | Snap => 0xA100 | {Guid_2} | W10HN5Q8I2_A000_{Guid_1} |
|  | Kata => 0xA200 | {Guid_3} | W10HN5Q8I2_A000_{Guid_1} |
|  | ... | ... | ... |
|  | [TypeID_n] | {Guid_n} | W10HN5Q8I2_A000_{Guid_1} |

Here, the workspace ID is formed by implementing an IHS service tag as a prefix, followed by appending a workspace type, and the GUID of the workspace 206, 209. Thus, the workspace 206, 209 in its associated IHS 100 may be identified by using the IHS service tag to direct the catalog information associated with that workspace 206, 209 to the appropriate IHS 100, and extracting the GUID from the IHS identifier to uniquely identify the workspace 206, 209 in that IHS 100.

Nevertheless, when the update agent 310 finishes consolidating the inventories for each of the workspaces 206, 209, it then sends the consolidated inventory to the orchestrator 302 at step 414. Then at step 416, the orchestrator 302 responds with either a success or failure message.

At step 418, the orchestrator 302 communicates with the DCRM agent 322 to create an update catalog according to the consolidated inventory. For example, DCRM agent 322 may indicate for each updateable component (e.g., container application 207, container bin/libs 208, etc.), if an updated version is available and whether the available version is compatible with the versions of other updatable components in the IHS 100. In one embodiment, the DCRM service 322 may also resolve any dependencies that may exist, such as intra-workspace dependencies, container-host software dependencies, inter-workspace dependencies, and/or Progressive Web App (PWA) dependencies. Thereafter at step 420, the DCRM service 322 sends the newly generated catalog to the orchestrator 302.

For sake of illustration, an example catalog generated by the DCRM service 322 may be as follows:

```
<?xml version="1.0" encoding="utf-16"?>
<Manifest baseLocation="downloads.dell.com" dateTime="2021-05-11T12:27:54+05:30" identifier="e6235fc6-5976-4c2d-8bbe-89f3fd01aa44" releaseID="D0T8G"
version="2021.02.11" xmlns="openmanage/cm/dm">
    <WorkspaceManifest>
        <Workspace id="W10HN5Q8I2_A000_630ba77c-5f0c-43a0-a8c4-096e5da442f2">
            <WorkspaceInformation version="6.0.1.8285" ipAddress"100.12.30.4" display="Sandboxie"/>
        </workspace>
        <Workspace id="W10HN5Q8I2_A100_9cb758a0-4fd1-4470-
```

-continued

```
bb28-ea6908d70751">
        <WorkspaceInformation version="1.0.2.8285"
ipAddress"100.12.30.5" display="Snap"/>
        </workspace>
    </WorkspaceManifest>
    <SoftwareComponent schemaVersion="3.0" releaseID="JCD80"
releaseDate="December 05, 2020" vendorVersion="1.17.54.1" dellVersion="A10"
packageType="MSI"
        path="FOLDER05171783M/3/ZoomInstaller.exe" packageID="JCDN0"
dateTime="2020-06-11T14:09:55+05:30" size="20042248" identifier="23bcc2cf-
595d-4da4-bb94-aa52b4f01e1e">
        <Name> <Display lang="en"><![CDATA[Zoom Application for
Conferencing]]></Display> </Name>
        <Category value="AP"> <Display
lang="en"><![CDATA[Application]]></Display> </Category>
        <SupportedDevices> <Device componentID="108083"
embedded="false"> <Display><![CDATA[Zoom Application for
conferencing]]></Display>
        </Device>
    </SupportedDevices>
    <SupportedWorkspaces>
    <Workspace id="W10HN5Q8I2__A000__630ba77c-5f0c-43a0-a8c4-
096e5da442f2"/>
    </SupportedWorkspaces>
    <Criticality value="1">
        <Display lang="en"><![CDATA[Recommended]]></Display>
    </Criticality>
    <Cryptography>
    <Hash
algorithm="MD5">ce7d3be2d7322c2cc056eb4610e8b5e3</Hash>
    <Hash
algorithm="SHA256">b4df6a1b12f97b1b70c914a2165086d64d68f9b1ae839391
c9cbf130475733a5</Hash>
    <Hash
algorithm="SHA1">d94608fff8165abc731269b227d7919d20db43a7</Hash>
    </Cryptography>
    </SoftwareComponent>
    </Manifest>
```

In one embodiment, the orchestrator 302 may perform certain operations based upon whether a container application 207 is to be migrated to another workspace 206, 209, whether it is newly added in a workspace 206, 209, or slated for deletion from its currently deployed workspace 206, 209. Additionally, the orchestrator 302 may perform certain operations based upon whether all of the container applications 207 in a particular workspace 206, 209 are to be migrated to another workspace 206, 209, such as one where one of the workspaces 206, 209 are to be migrated to a cloud-based workspace, or vice-versa. The orchestrator 302 may detect such changes in any suitable manner. In one embodiment, the orchestrator 302 compares the currently generated catalog with a previously generated catalog for each IHS 100.

Table 2 shows several example operations that may be performed by the orchestrator 302 when it detects certain changes to the catalog.

TABLE 2

| Workspace change notification | Action done by Orchestrator |
|---|---|
| New workspace created/added | Find the workspace catalog, if not create a new one; and link it to the IHS catalog |
| Workspace purge | Unlink workspace from IHS catalog. Delete the entire workspace catalog, along with its apps and dependencies |
| App addition to an existing workspace | Find the workspace catalog, update the app and its dependencies. |
| App deletion in an existing workspace | Find the workspace catalog, delete the app and its dependencies |

TABLE 2-continued

| Workspace change notification | Action done by Orchestrator |
|---|---|
| Workspace migrated from cloud to IHS or vice-e-versa (Inter IHS orchestration) | The exact workspace replica will be created at the destination. Identify the app's source-workspace & the destination workspace and move the entire app and its dependencies from source workspace catalog to destination workspace catalog. The source workspace catalog will be deleted as part of 'workspace purge' notification. |
| Apps moved across different workspace type (Intra IHS orchestration) | If the app type is not changed across the movement, do the same step as case #5. If the app type has changed (Ex: Zoom app migrated from Linux Kata container to Hyper-V docker having Win10; the hyper-V docker for Win10 will host Zoom windows executable rather than the Linux executable), delete the app-info in the source workspace catalog (case #4) and add the app-info (new-type say Zoom windows exe info) in the new WS catalog (case #3). |

As shown in Table 2, the orchestrator 302 may perform different operations based upon the type of changes to the workspaces 206, 209. For example, upon determining that a workspace 206, 209 has been added or deleted, the orchestrator 302 may generate or delete, respectively, a new inventory for the added workspace. As another example, the orchestrator 302, upon determining that an application has been added or deleted from a workspace, add or delete, respectively, information associated with the application the inventory associated with the workspace. For cases in which the workspace is migrated to/from the IHS 100 (e.g., inter IHS migration) via a cloud-based workspace, the orchestrator 302 migrates the applications from the first workspace to the second workspace and purges the inventory associated with the first workspace. Moreover, when the destination workspace 206, 209 is a different type (e.g., intra IHS migration), delete the application information from the source workspace catalog and add the application information in the destination workspace catalog. Given this example, if a Zoom application is to be migrated from a Linux-based workspace 206, 209, the orchestrator 302 may delete the information associated with a Linux-based Zoom executable (e.g., Zoom.deb) from the source workspace 206, 209, and add information associated with a Windows-based Zoom executable (e.g., zoom.exe) to the destination workspace catalog.

When the orchestrator 302 receives the catalog, it may then display its contents for view by a user on the ITDM management console 304 at step 422. For example, the orchestrator 302 may display the catalog as an editable itemized list of software updates that are to be applied to the updatable components of the IHS 100 as well as any updatable components deployed in each workspace 206, 209. Given this displayed list, the user (e.g., ITDM) may be able to accept certain updates and reject other updates (e.g., approve deployment) at step 424. For example, the ITDM management console 304 may display a certain update to a container application 207 that is known by the user to cause certain problems. In such a case, the user would be able to reject that update and accept the other updates. In one embodiment, if the user rejects one or more updates, the orchestrator 302 may communicate again with the DCRM service 322 to ensure that any dependencies are not violated if that update is not installed. After the user has either approved or disapproved deployment of the updates included in the catalog, the ITDM management console 304 issues a request to deploy the approved updates at step 426.

Continuing with the description of the method 400 on FIG. 4B, when the orchestrator 302 receives the request to deploy the approved updatable components in the catalog from the ITDM at step 426, it sends instructions and consolidated catalog to the update agent 310 to deploy the updates identified in the catalog at step 428. Because the GUID for the catalog associated with each workspace 206, 209 has been expanded to include its respective IHS unique identifier, the orchestrator 302 may easily identify, for each IHS 100A-N in the system, the target destination for each catalog. Additionally, the update agent 310 may easily identify the target destination workspace 206, 209 for each workspace 206, 209 by extracting the workspace GUID from the workspace ID.

At step 430, the update agent 310 identifies the updates for each workspace 206, 209, and at step 432, it deploys those updates for each workspace 206, 209. Thereafter at step 434, the per workspace agent 325 downloads each of the updates to the enterprise support portal 320, and installs the downloaded updates onto the workspace 206, 209 at step 438.

At step 440, the per workspace agent 325 reports the update status to the update agent 310, which then generates a consolidated update status for each of the workspaces 206, 209 at step 442, and sends the consolidated update status to the orchestrator 302 at step 444. The orchestrator 302 may then display the results of the consolidated update status for view by the ITDM at step 446. At this point, each of the workspaces 206, 209 configured in the IHSs 100A-N have been updated with new software and the process ends.

Although FIGS. 4A and 4B describe an example method that may be performed to update the workspaces 206, 209 in multiple IHSs 100A-N, the features of the method 400 may be embodied in other specific forms without deviating from the spirit and scope of the present disclosure. For example, the method 400 may perform additional, fewer, or different operations than those described in the present examples. As another example, certain steps of the aforedescribed method 400 may be performed in a sequence different from that described above. As yet another example, certain steps of the method 400 may be performed by other components in the IHS 100 other than those described above.

Figure 5:
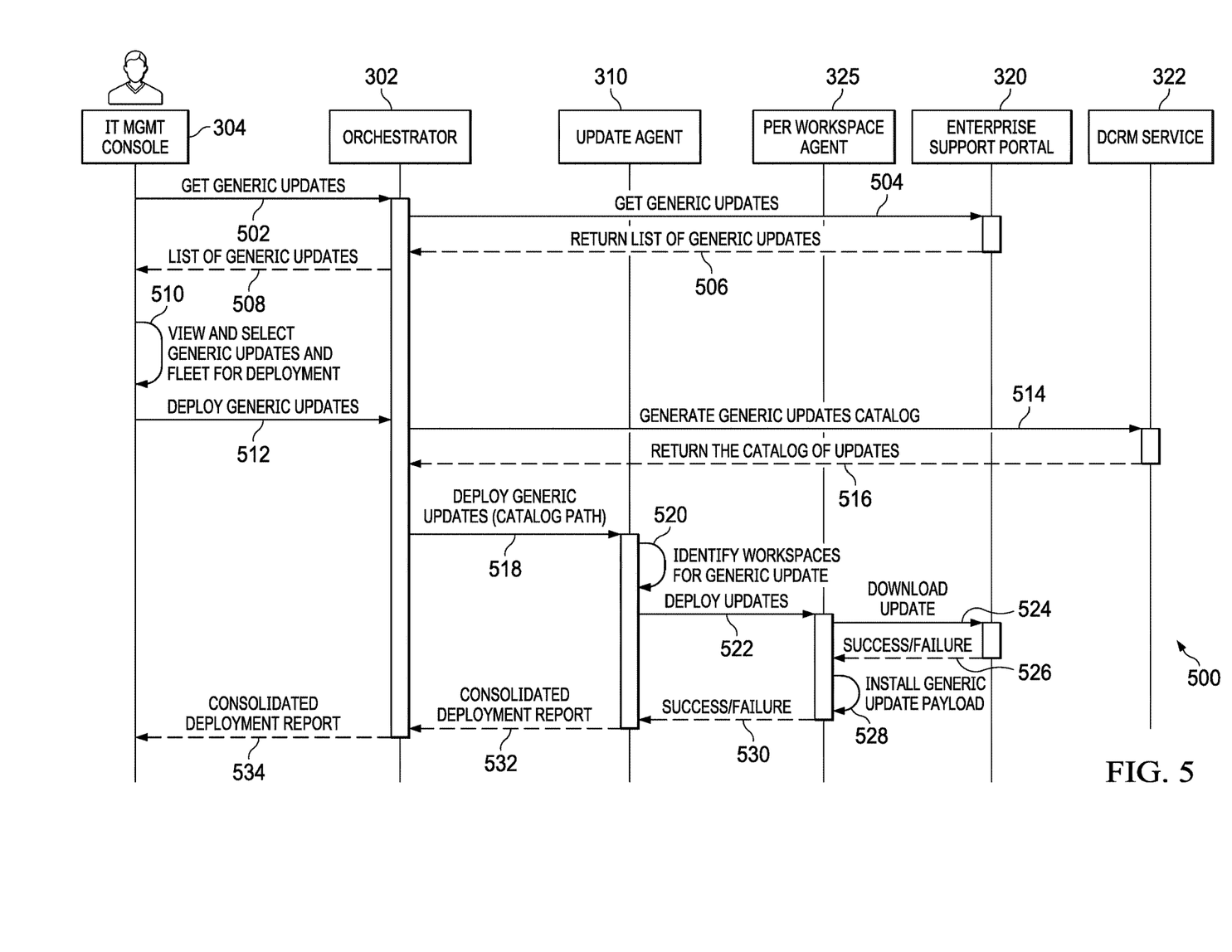
FIG. 5 illustrates a workflow diagram describing certain steps of an embodiment of a workspace management method that may be used to update generic updates according to one embodiment of the present disclosure.

FIG. 5 illustrates a workflow diagram describing certain steps of an embodiment of a workspace management method 500 that may be used to update generic updates according to one embodiment of the present disclosure. As will be described in detail herein below, the method 500 may be provided for updating software across multiple heterogeneous workspaces 206, 209 deployed in one or more IHSs 100. Such a scenario may exist where software updates are to be performed regardless of any addition/deletion of containerized applications 207, addition/deletion of workspaces 206, 209, migration of containerized applications 207 to a different workspace 206, 209, and/or migration of one workspace 206, 209 to another workspace 206, 209. The workspace management method 500 may be implemented in such a scenario to update each of the workspaces 206, 209 of multiple (e.g., a fleet) IHSs 100A-N from an ITDM management console 304. Although only one per workspace agent 325 associated with one workspace 206, 209 is shown in the method 400, it should be understood that the method 500 can be practiced with any quantity of per workspace agents 325, such as two or more per workspace agents 325 for updating the containerized applications 207 of their associated workspaces 206, 209.

At step 502, the ITDM management console 304 issues a request to the orchestrator 302 to get generic updates that are available for the IHSs 100A-N. Thereafter at step 504, the orchestrator 302 issues a request to obtain generic updates from the enterprise support portal 320. The updates may include those related to application updates, driver updates, and firmware updates. In general, the enterprise support portal maintains a list of all updates that have been made over a specified time period (e.g., 3 months) such that, when requested by the orchestrator 302, it can provide information about those available updates to the orchestrator 302. Thereafter at step 506, the enterprise support portal 320 responds by providing that list of available generic updates so that the orchestrator 302 may, in turn, display the available generic updates on the ITDM management console 304 for view by the ITDM at step 508.

At this point, the ITDM may examine the available generic updates and select those updates to be deployed on the one or more IHSs 100A-N at step 510. For example, the ITDM may have knowledge of certain updates that would be beneficial to be deployed as well as other updates that would not be needed or recommended at that time. Possessing this knowledge enables the ITDM to select only those generic updates that are known to be beneficially deployed on the IHSs 100A-N.

At step 512, the ITDM management console 304 issues a request to the orchestrator 302 to deploy those selected generic updates. Thereafter at step 514, the orchestrator 302 communicates with the DCRM service 322 to generate a generic update catalog based on the selected generic updates. In response, the DCRM service 322 sends the generated catalog to the orchestrator 302 at step 516.

At step 518, the orchestrator 302 deploys the generic update catalog to the update agent 310 of each IHS 100 in the system. In turn, the update agent 310 identifies the workspaces 206, 209 that are to receive the updates at step 520. For example, the update agent 310 may maintain inventory information about each workspace 206, 209 so that when a generic update is processed for deployment, it can determine if the generic update is pertinent to that particular workspace 206, 209.

At step 522, the update agent 310 deploys the generic updates to those pertinent workspaces 206, 209 by communicating with their respective per workspace agents 325. In turn, each per workspace agent 325 downloads the generic updates from the enterprise support portal 320 at step 524, and at step 526, the enterprise support portal 320 responds with either a success or failure to the generic update download process. Thereafter at step 528, the per workspace agent 325 installs the generic updates on their associated workspaces 206, 209.

Following installation of the generic updates, the per workspace agent 325 sends either a success or failure message to the update agent 310 of each IHS 100 at step 530, which in turn, forwards the success/failure message to the orchestrator 302 at step 532, which in turn, forwards the success/failure message to the ITDM management console 304 at step 534. At this point, each of the workspaces 206, 209 in the IHSs 100A-N have been updated with generic software and the process ends.

Although FIG. 5 describes an example method 500 that may be performed to update the workspaces 206, 209 in multiple IHSs 100A-N with generic updates, the features of the method 500 may be embodied in other specific forms without deviating from the spirit and scope of the present disclosure. For example, the method 500 may perform additional, fewer, or different operations than those described in the present examples. As another example, certain steps of the aforedescribed method 500 may be performed in a sequence different from that described above. As yet another example, certain steps of the method 500 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. An Information Handling System (IHS), comprising:
a plurality of workspaces that are each deployed with one or more applications, wherein each of the workspaces are configured to manage the operation of their respective applications; and
at least one memory including instructions that, upon execution by at least one processor, cause the IHS to:
obtain a plurality of inventories corresponding to the plurality of workspaces, wherein the inventories each include information associated with the applications deployed in its respective workspace;
for each inventory:
identify the workspace associated with the inventory;
determine which of the applications are to be updated with new software by identifying one of the applications that has been migrated from a first workspace to a second workspace and when the migrated application is a different type relative to the application executed on the first workspace, move the application and dependency information associated with the application from the first workspace to the second workspace in the inventory; and
deploy the determined new software to the identified workspace.

2. The IHS of claim 1, wherein the instructions further cause the IHS to identify the workspace by extracting at least a portion of the Global Universal Identifier (GUID) from the IHS identifier.

3. The IHS of claim 1, wherein the instructions further cause the IHS to determine one or more drivers or a firmware that is to be updated, and deploy the determined drivers or firmware to the identified workspace.

4. The IHS of claim 1, wherein the IHS comprises a plurality of bare-metal computing devices, wherein the instructions are further executed to obtain the plurality of inventories according to one or more of the workspaces deployed on each of the bare-metal devices.

5. The IHS of claim 1, wherein the instructions further cause the IHS to determine which of the applications are to be updated with new software by identifying a newer version of at least one of the applications.

6. The IHS of claim 1, wherein the first workspace comprises at least one of a software-based workspace, a hardware-based workspace, or a cloud-based workspace, and the second workspace comprises a different one of the software-based workspace, the hardware-based workspace, or the cloud-based workspace, and wherein the instructions further cause the IHS to:

migrate the applications from the first workspace to the second workspace; and purge the inventory associated with the first workspace.

7. The IHS of claim 1, wherein the first workspace is a different type relative to the second workspace, and wherein the instructions further cause the IHS to:

when the application is the same type on the second workspace, move the applications from the first workspace to the second workspace, and purge the inventory associated with the first workspace.

8. The IHS of claim 1, wherein the instructions further cause the IHS to identify the workspace associated with the inventory by:

when the workspace has been determined to be added to the IHS, generate a new inventory for the added workspace; and when the workspace has been determined to be deleted from the IHS, delete the inventory associated with the deleted workspace.

9. The IHS of claim 1, wherein the instructions further cause the IHS to determine which of the applications are to be updated with new software by:

when one of the applications has been determined to be added to one of the workspaces, add information associated with the application to the inventory associated with the one workspace; and when one of the applications has been determined to be deleted from the one workspace, delete information associated with the deleted application from the inventory associated with the one workspace.

10. A method comprising:

obtaining, using instructions stored in at least one memory and executed by at least one processor, a plurality of inventories corresponding to a plurality of workspaces that are each deployed with one or more apps applications, wherein the inventories each include information associated with the applications deployed in its respective workspace, and wherein each of the workspaces are configured to manage the operation of their respective applications;

for each inventory:

identifying, using the instructions, the workspace associated with the inventory;

determining, using the instructions, which of the applications are to be updated with new software by identifying one of the applications that has been migrated from a first workspace to a second workspace and when the migrated application is a different type relative to the application executed on the first workspace, move the application and dependency information associated with the application from the first workspace to the second workspace in the inventory; and deploying, using the instructions, the determined new software to the identified workspace.

11. The method of claim 10, further comprising identifying the workspace by extracting at least a portion of the Global Universal Identifier (GUID) from the IHS identifier.

12. The method of claim 10, further comprising determining one or more drivers or a firmware that are to be updated, and deploy the determined drivers or firmware to the identified workspace.

13. The method of claim 10, wherein the IHS comprises a plurality of bare-metal computing devices, wherein the instructions are further executed to obtain the plurality of inventories according to one or more of the workspaces deployed on each of the bare-metal devices.

14. The method of claim 10, further comprising migrating the applications from a first workspace to a second workspace, and purging the inventory associated with the first workspace, wherein the first workspace comprises at least one of a software-based workspace, a hardware-based workspace, or a cloud-based workspace, and the second workspace comprises a different one of the software-based workspace, the hardware-based workspace, or the cloud-based workspace.

15. The method of claim 10, further comprising when the application is a same type on the second workspace, migrate the applications from the first workspace to the second workspace, and purge the inventory associated with the first workspace, and when the application is a different type relative to the application executed on the second workspace, move the application and dependency information associated with the application from the first workspace to the second workspace definition in the catalog.

16. The method of claim 10, further comprising identifying the workspace associated with the inventory by:

when the workspace has been determined to be added to the IHS, generating a new inventory for the added workspace; and when the workspace has been determined to be deleted from the IHS, deleting the inventory associated with the deleted workspace.

17. The method of claim 10, further comprising determining which of the applications are to be updated with new software by:

when one of the applications has been determined to be added to one of the workspaces, adding information associated with the application to the inventory associated with the one workspace; and when one of the applications has been determined to be deleted from the one workspace, deleting information associated with the deleted application from the inventory associated with the one workspace.

18. A workspace orchestrator comprising instructions stored in at least one memory and executed by at least one processor to:

obtain a plurality of inventories corresponding to a plurality of workspaces that are each deployed with one or more applications, wherein the inventories each include information associated with the applications deployed in its respective workspace, and wherein each of the workspaces are configured to manage the operation of their respective applications; and for each inventory:

identify the workspace associated with the inventory;

determine which of the applications are to be updated with new software by identifying one of the applications that has been migrated from a first workspace to a second workspace and when the migrated application is a different type relative to the application executed on the first workspace, move the application and dependency information associated with the application from the first workspace to the second workspace in the inventory; and deploy the determined new software to the identified workspace.

* * * * *

UNITED STATES PATENT AND TRADEMARK OFFICE
CERTIFICATE OF CORRECTION

| | | |
|---|---|---|
| PATENT NO. | : 12,236,224 B2 | Page 1 of 1 |
| APPLICATION NO. | : 17/524949 | |
| DATED | : February 25, 2025 | |
| INVENTOR(S) | : Vivekanandh Narayanasamy Rajagopalan et al. | |

It is certified that error appears in the above-identified patent and that said Letters Patent is hereby corrected as shown below:

In the Claims

In Column 19, Line 36, Claim 10, delete "apps applications, wherein the inventories each include" and insert -- applications, wherein the inventories each include -- therefor.

Signed and Sealed this
Twenty-fifth Day of March, 2025

Coke Morgan Stewart
*Acting Director of the United States Patent and Trademark Office*